Aug. 27, 1963       J. DORY ETAL       3,102,210
IMPROVEMENTS IN THE MOUNTING OF ELECTROMAGNETIC
TRANSDUCER ELEMENTS
Filed Sept. 28, 1959
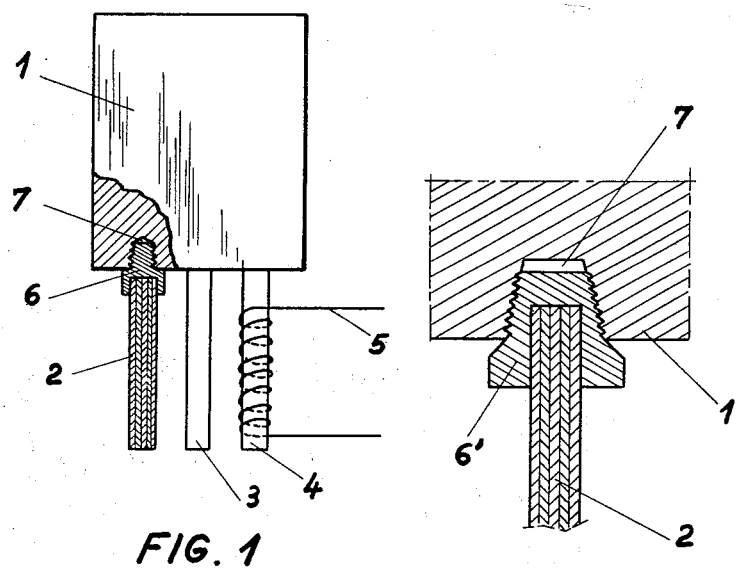
FIG. 1
FIG. 2
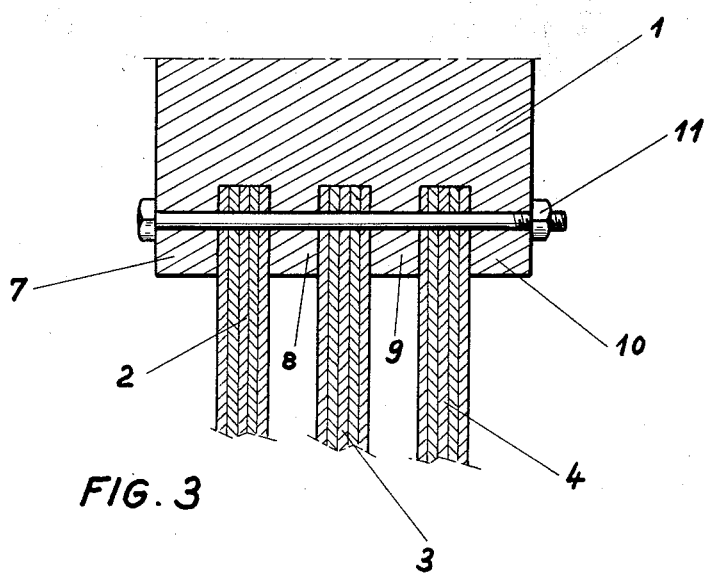
FIG. 3

# United States Patent Office 3,102,210
Patented Aug. 27, 1963

3,102,210
IMPROVEMENTS IN THE MOUNTING OF ELECTROMAGNETIC TRANSDUCER ELEMENTS
Jacques Dory and Jean-Jacques Renaut, Meaux, France, assignors to Realisations Ultrasoniques, Meaux, France, a corporation of France
Filed Sept. 28, 1959, Ser. No. 842,943
Claims priority, application France Sept. 27, 1958
5 Claims. (Cl. 310—26)

The present invention relates to magnetostrictive transducers adapted to convert electrical energy into elastic, and particularly ultrasonic vibrations and vice-versa.

Transducers are known consisting of an assembly of nickel sheets or any other magnetostrictive material, shaped in such a manner as to form, after being assembled, a unit comprising a solid portion adapted for being in contact with the medium to which it is desired to transmit the vibrations (or from which vibrations are to be received) and a cut-out portion supporting one or a plurality of energizing windings through which flows an electric current.

Transducers having the above known structure have serious drawbacks; more particularly, such a structure results in a loss of magnetic flux in the solid portion, and the cutting and assembling operations are delicate to carry out.

Magnetostrictive transducers have also been devised comprising a magnetostrictive core on which an energizing coil is wound, said magnetostrictive core being secured to a cylindrically-shaped, non magnetostrictive body—or other solid element—adapted to transmit vibrations.

This structure, although more rapid and cheaper to manufacture than the previously mentioned one, involves difficult manufacturing process for large power output transducers, as the magnetostrictive core must then be formed with a rather large end cross-section, along which it will be secured to the cylindrical or tapered transmisison solid unit. The fastening thereof by means of hard soldering, for instance, requires said wide-area end cross-section of the magnetostrictive core to be heated at a high temperature, while the nickel strips which constitute the core in a practical embodiment of the example considered, must be maintained perfectly assembled. This operation is a highly difficult one.

It is therefore an object of the present invention to provide an improved high power magnetostrictive transducer of the above mentioned solid transmission unit type, which is much easier to build than the prior art transducers of said type.

According to the invention, a high power magnetostrictive transducer comprises a plurality of small magnetostrictive cores in the shape of bars, rods, or the like, which are much more easily secured to the solid transmission unit then the prior art tapered magnetostrictive core having a large cross-section.

According to one embodiment of the invention, each of these small cores are preferably made up of a plurality of assembled strips made of nickel or other metal having magnetostrictive properties bonded together by means of a suitable adhesive, the assembled cores being secured by brazing or punching, in a recess provided at one end of a bolt or screw, the other end of which is screwed into the solid transmission unit.

The invention will be best understood from the following description and appended drawings, in which:

FIG. 1 illustrates diagrammatically a transducer according to the invention comprising a plurality of magnetostrictive bars secured to bolts screwed into a solid transmission unit, FIG. 2 shows on an enlarged scale a portion of the solid transmission unit on which one of the bars is secured by punching and FIG. 3 shows on an enlarged scale, the manner according to which the bars are secured to projections on the solid transmission unit.

Referring to the drawing, the solid transmission unit is made of a non-magnetostrictive substance, for instance, aluminium, which is adapted to transmit acoustical vibrations, but not to produce them. The generation of the vibrations is effected by means of cores 2, 3, 4, etc. carrying energizing windings, such as 5. In FIG. 1, winding 5 only is shown, the other windings being omitted for clarity sake.

All the figures show in detail, in cross-section, the way according to which one of the cores is secured to the transmission unit.

Said cores are preferably shaped as bars formed by a stack of rectangular strips, for instance of nickel, as shown in 2.

In the particular embodiment of the device shown in FIG. 1, said nickel strips are located in a recess formed on bolt 6 and brazed therein for instance by means of high-frequency heating.

Subsequently, and prior to screwing into transmisison unit piston 1, the bolt, which carries the strips forming the bar, and which are spread apart fan-wise, is for instance dipped into an adhesive thermosetting resin bath, such as the one known under the trade name "Araldite."

The unit coated with "Araldite" is then heated, with the view of causing the resin to set by polymerization. The threaded, "Araldite" coated bolt is then fixedly screwed into unit 1, leaving behind a pocket 7 (FIGS. 1 and 2) between the end of the bolt and the body of unit 1.

This pocket is filled with oil, which improves the acoustical contact between bar 2 and unit 1. This contact is also substantially improved due to the particular bonding method used, as described hereinabove.

In the embodiment illustrated in FIG. 2, bolt 6' is in the shape of a key, and as the bolt is screwed into unit 1, its slot end shrinks about the strips of bar 2, which are thus maintained firmly together, without any preliminary brazing operation. Since it is not necessary to apply any heat on the bar in this embodiment as it does not require any brazing, the strip block will advantageously be coated with "Araldite," before being inserted into the slot of the bolt.

In both embodiments illustrated and described, the strips which form the bars are secured to elements screwed into the solid transmitting unit. Such elements may however be omitted. Each bar is then brazed or hard soldered into a recess formed on the surface of the transmitting unit. Said recess will be well isolated thermically from the adjacent recesses to avoid the soldering operation of a bar causing too large a surface of the transmission unit to be heated. Another embodiment involves wedging the bars fixedly in the slots formed between the projecting portions of the transmitting unit.

This latter embodiment is illustrated in FIG. 3, wherein the bars 2, 3, 4 are wedged in the slots comprised between projections 8, 9, 10.

It is to be understood that various modifications may be effected, without limiting the scope of the invention, the preferred embodiment of which is however that illustrated in FIG. 1.

What we claim is:

1. A transducer for transducing electrical energy into compression wave energy comprising a block of material adapted for transmitting compression wave energy to a medium in contact therewith and having a plurality of cavities, a plurality of members threaded into said cavities and having respective external recesses and a plurality of laminated magnetostrictive bars having ends respectively inserted into said recesses.

2. A transducer for transducing electrical energy into compression wave energy comprising a block of material adapted for transmitting compression wave energy to a medium in contact therewith and having a plurality of cavities having first walls, a plurality of members threaded into said cavities and having respective external recesses having second walls, a cementing material interposed between said first walls and said members, a plurality of laminated magnetostrictive bars having ends respectively inserted into said recesses, and a cementing material interposed between said bars and said second walls.

3. A transducer for transducing electrical energy into compression wave energy comprising a block of material adapted for transmitting compression wave energy to a medium in contact therewith and having a plurality of cavities, a plurality of members shaped as caps having a portion threaded into said cavities and another portion extending outwardly of said block, and a plurality of laminated magnetostrictive bars having ends respectively inserted into said recesses.

4. A transducer for transducing electrical energy into compression wave energy comprising a block of material adapted for transmitting compression wave energy to a medium in contact therewith and having a plurality of cavities, a plurality of members shaped as caps having a portion threaded into said cavities and another portion extending outwardly of said block, and a plurality of laminated magnetostrictive bars having ends respectively inserted into said recesses, said portion and said cavities being substantially the shape of a truncated cone and the material from which said caps are made being sufficiently resilient in order for the volume of said recesses to be reduced upon insertion of said members into said cavities and for the walls thereof to be forcibly applied against said bars to grip them.

5. A transducer for transducing electrical energy into compression wave energy comprising a block of material adapted for transmitting compression wave energy to a medium in contact therewith and having a plurality of cavities, a plurality of members threaded into said cavities and having respective external recesses, enclosed pockets being respectively provided between the bottom of said cavities and said members, said pockets containing a compression wave transmitting liquid and a plurality of laminated magnetostrictive bars having ends respectively inserted into said recesses.

References Cited in the file of this patent

UNITED STATES PATENTS

| | | |
|---|---|---|
| 2,116,522 | Kunze | May 10, 1938 |
| 2,207,539 | Grauley | July 9, 1940 |
| 2,368,609 | Burkhardt | Jan. 30, 1945 |
| 2,406,767 | Hayes | Sept. 3, 1946 |
| 2,808,522 | Dranetz | Oct. 1, 1957 |
| 2,815,193 | Brown | Dec. 3, 1957 |
| 2,956,789 | Rich | Oct. 18, 1960 |

FOREIGN PATENTS

| | | |
|---|---|---|
| 1,163,573 | France | Apr. 28, 1958 |